March 31, 1964  J. TALAMONTI  3,127,184
SELF-CONTAINED ANNULAR FLUID SEAL
Filed Aug. 15, 1962
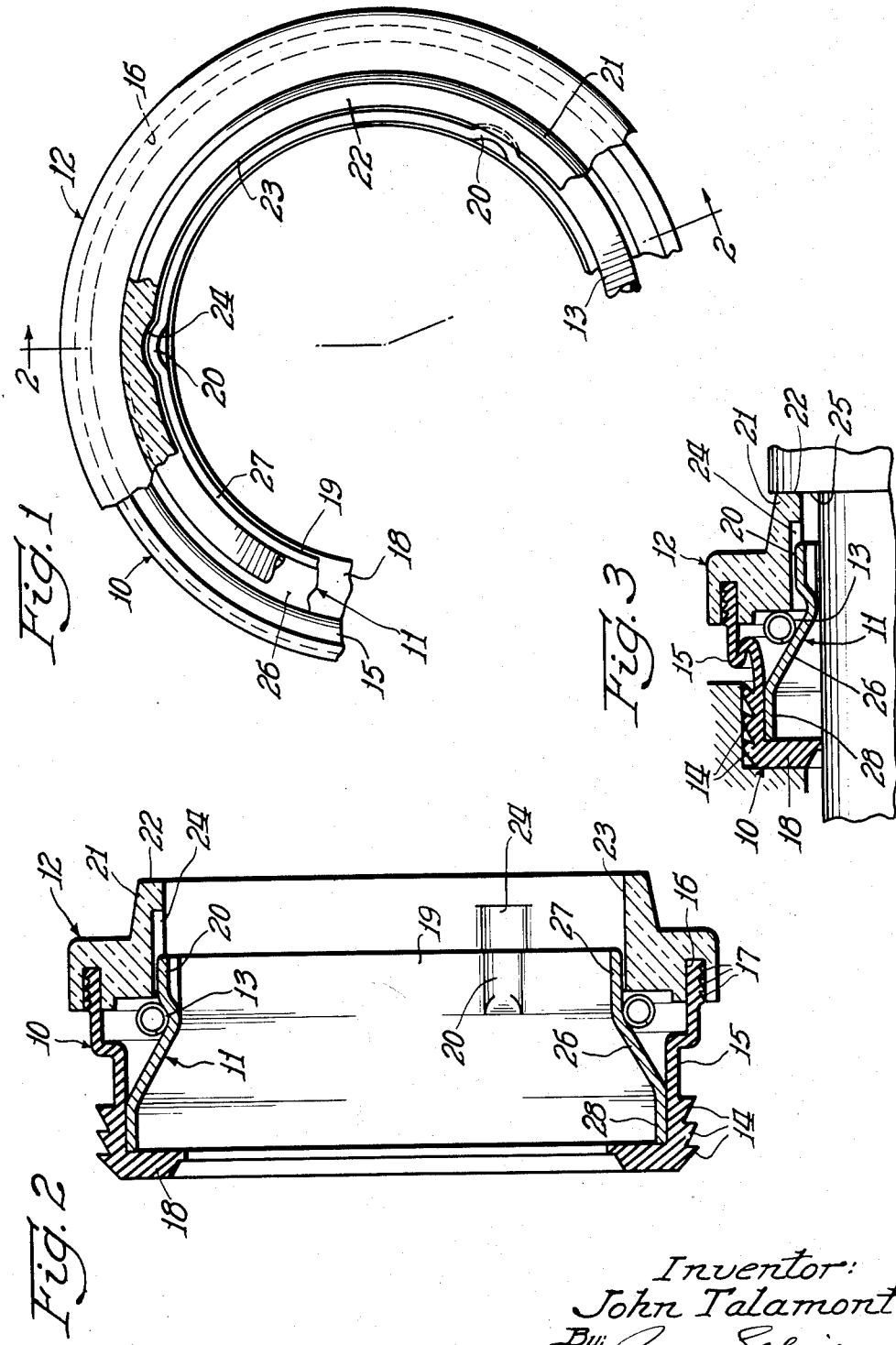

United States Patent Office 3,127,184
Patented Mar. 31, 1964

3,127,184
SELF-CONTAINED ANNULAR FLUID SEAL
John Talamonti, Chicago Heights, Ill., assignor to Borg-Warner Corporation, Chicago, Ill., a corporation of Illinois
Filed Aug. 15, 1962, Ser. No. 217,066
2 Claims. (Cl. 277—42)

This invention relates to an annular fluid sealing means adapted to be associated with a pair of relatively rotatable parts. More particularly, this invention relates to a shaft seal which comprises that type of seal commonly known as a flexible, axially extensible self-contained unit.

It is important that the various parts of an annular sealing unit be interconnected one with the other to prevent disassembling thereof when shipping, installing or removing from a shaft, etc. Further, it is necessary that the parts of a sealing device be provided with means to prevent relative rotation of the individual parts.

One of the primary features of this invention is to provide a seal that may be assembled and disassembled with ease, yet will not come apart in shipment, during operation of the seal on a shaft or during installation or removal from the shaft. Further, this invention provides a seal that is keyed against relative rotation of the individual parts of the seal.

A preferred form of this invention is an annular seal comprised of a flexible boot member, a rigid tubular body member of a sloping configuration and a sealing ring. When assembled, the rigid body member is telescoped through the boot and sealing ring, i.e. it is concentric to both the boot and sealing ring and is keyed to the sealing ring to prevent relative rotation with respect thereto. The flexible boot member has arrow or wedge shaped annular rib-like formations on the outer periphery of both ends to retain the forward end of the boot within a groove in the sealing ring and the rearward end within a housing from which a shaft extends. The rib-like formations on the forward end also prevent separation of the boot from the sealing ring while in operation or during placement of the seal in a housing or removal therefrom. The rib-like formations on the forward end thus have the advantage of retaining the seal parts together as a unitary device which may be shipped from the factory, installed on a shaft or removed therefrom without danger of accidental separation of its parts.

Other features of this invention will be apparent from the following detailed description taken together with the accompanying drawings in which:

FIGURE 1 is a partial end view of one embodiment of the integral seal of this invention;

FIGURE 2 is a cross-sectional view taken on angular lines 2—2 of FIGURE 1; and

FIGURE 3 is a partial view of the seal of FIGURES 1 and 2 showing the seal in its compressed condition as applied to a shaft protruding from a housing.

Referring in detail to the drawings, there is shown the integral seal comprised of a flexible boot member 10, a rigid tubular body member of sloping configuration 11 and a sealing ring 12. The sealing ring 12 is placed under outward pressure with respect to flexible boot 10 by an endless helical spring 13 at the base of the slope of tubular member 11.

Flexible boot member 10 is provided on the outer periphery of its rearward end with arrow-like ribs 14 and an inwardly extending flange 18 and has a flexible distortable middle section 15 which extends forwardly to become inserted into a groove 16 of sealing ring 12 (best shown in FIGURES 2 and 3). Boot 10 is also provided with arrow-like ribs 17 on its forward end that retain boot 10 within groove 16 of sealing ring 12 when the sealing device is assembled as a unitary device. Flexible boot 10 may be constructed of an elastomeric material such as synthetic or natural rubber or the like.

Tubular body member 11 is comprised of a section of greatest uniform diameter 28, a sloping section 26 and a section of smallest uniform diameter 27. Section 28 of tubular member 11 is telescoped within and concentric with respect to the rearward portion of flexible boot 10 and abuts flange 18 of flexible boot 10 at the rearward end thereof. The largest uniform diameter 28 of tubular member 11 is at the rearward portion of the sealing device, i.e. immediately adjacent flange 18, and slopes downwardly therefrom to its smallest uniform diameter 27 within and concentric to sealing ring 12. The smallest uniform diameter 27 of rigid tubular member 11 extends into sealing ring 12. In the central opening 19 of smallest uniform diameter 27 of tubular member 11 are a series of circumferentially spaced, longitudinally and outwardly extending protuberances 20 that open into the forward end of tubular member 11 and terminate at that point where the uniform diameter 27 ends and sloping section 26 of tubular member 11 begins. Endless helical spring 13 extends around the outer periphery of member 11 and normally rests at that point where the uniform diameter 27 of tubular member 11 ends and the sloping section 26 begins.

Sealing ring 12 is desirably molded of an antifriction substance, such as a phenolic condensation product impregnated with graphite. Sealing ring 12 has an annular nose 21 at its forward end that makes a rotary fluid sealing engagement with the radial surface of a shaft boss 25 (see FIGURE 3), thereby guarding against the passage of fluid therepast. Sealing ring 12 also has a lapped or ground face 22 on nose 21 where it is adapted to engage the surface of shaft boss 25. In the central opening 23 of the sealing ring 12 are a series of circumferentially spaced, longitudinally extending grooves 24 that extend from the forward to the rearward end of ring 12.

The protuberances 20 on tubular member 11 correspond and register respectively with the grooves 24 in sealing ring 12, and prevent relative rotative movement of the sealing ring 12 with respect to tubular member 11 and boot 10, and yet allow relative longitudinal or axial movement. Thus, as longitudinally or axially directed force is exerted on nose 21 of ring 12, ring 12 will move rearwardly and protuberances 20 of tubular member 11 will slide in grooves 24 of sealing ring 12. Also, helical spring 13 will move upwardly and rearwardly on the sloping section 26 of tubular member 11, thus expanding in diameter and exerting force opposing that which is exerted on the face 22 of sealing ring 12 and tending to cause the sealing device to seek its expanded position.

It may be noted that in assembling the seal, tubular member 11 is slid into boot 10 to abut flange 18 of boot 10. Spring 13 is then placed around the end of smallest uniform diameter 27 of tubular member 11. Sealing ring 12 is fitted over tubular member 11 and the grooves 24 in ring 12 are registered with protuberances 20 of member 11. Rib-like formations 17 on boot 10 are forced into groove 16 of sealing ring 12 to complete the assembly. Thus, the seal assembly, including the sealing ring, is held together as a unitary device which may be shipped from the factory, as well as placed on a shaft or removed therefrom without danger of accidental separation of its parts.

Though one embodiment of the invention has been described, it is to be understood that such changes and modifications may be made as fall within the spirit and scope of the invention as set forth in the following appended claims.

I claim:
1. An annular fluid seal comprising a flexible boot member, a frusto conical tubular member, an annular sealing washer and an endless thrust transmitting helical spring, said tubular member telescoped within said flexible boot member and said sealing washer, said helical spring extending around that portion of said tubular member of smallest diameter, said flexible boot member and sealing washer detachably connected to each other by means of annular rib-like formations on the outer periphery of the forward end of said boot member, said thrust transmitting helical spring adapted to move rearwardly and upwardly on the sloping surface of said frusto conical tubular member when axial force is applied to the face of the said sealing washer, said sealing washer and said tubular member keyed to prevent relative rotation with respect to each other and to allow longitudinal or axial movement with respect to each other.

2. A seal comprising an annular flexible boot member, a frusto conical tubular member, an annular sealing washer and an endless thrust transmitting helical spring, said tubular member telescoped within said flexible boot member and said sealing washer, said helical spring extending around said frusto conical tubular at that point of smallest diameter and adapted to move rearwardly and upwardly on the sloping surface of said frusto conical member when axial force is applied to said sealing washer, said flexible boot member and said sealing washer adapted to be detachably connected together, said flexible boot member integrally attached to said sealing washer by means of arrow-like rib formations on the outer periphery of the forward end of said boot member inserted in an annular slot in said sealing washer, said sealing washer and tubular member keyed to prevent relative rotation with respect to each other and to allow longitudinal or axial movement with respect to each other.

References Cited in the file of this patent

UNITED STATES PATENTS

| | | |
|---|---|---|
| 2,462,067 | Buckendale | Feb. 22, 1949 |
| 2,521,137 | Vedovell | Sept. 5, 1950 |